United States Patent
Hawes et al.

(10) Patent No.: US 6,252,677 B1
(45) Date of Patent: Jun. 26, 2001

(54) METHOD AND APPARATUS FOR RENDERING OBJECT ORIENTED IMAGE DATA USING MULTIPLE RENDERING STATES SELECTED BASED ON IMAGING OPERATOR TYPE

(75) Inventors: Michael Kerrigan Hawes, Pittsford, NY (US); Tse-Kee Chan, Palo Alto, CA (US); Fritz F. Ebner, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/105,657

(22) Filed: Jun. 26, 1998

Related U.S. Application Data (60) Provisional application No. 60/084,625, filed on May 7, 1998.

(51) Int. Cl.[7] .................................................. G06F 15/00
(52) U.S. Cl. ..................... 358/1.9; 358/1.18; 358/1.15
(58) Field of Search .................................. 358/1.9, 1.18, 358/1.16, 1.17, 1.15, 1.13, 1.8, 1.6, 1.2, 1.1, 1.11, 1.14, 468, 407; 345/433, 501, 502, 503, 522, 526; 364/478.07; 700/219; 707/103 R, 103 V, 103, 104, 103 Z, 502, 526, 911; 382/180

(56) References Cited

U.S. PATENT DOCUMENTS

| | | | |
|---|---|---|---|
| 5,303,334 | * 4/1994 | Snyder et al. | .................. 358/1.9 |
| 5,500,928 | * 3/1996 | Cook et al. | .................. 345/433 |
| 5,535,307 | * 7/1996 | Glass | ..................... 358/1.8 |
| 5,704,021 | * 12/1997 | Smith et al. | .................. 358/1.9 |
| 5,859,958 | * 1/1999 | Chan et al. | .................. 358/1.18 |
| 5,959,867 | * 9/1999 | Speciner et al. | .............. 364/478.07 |

* cited by examiner

*Primary Examiner*—Dov Popovici
(74) *Attorney, Agent, or Firm*—Fay, Sharpe, Fagan, Minnich & McKee, LLP (57) ABSTRACT

A method and apparatus of rendering object oriented image data into a frame buffer of an imaging device using a set of rendering state information is provided. Object oriented image data is read into the imaging device together with an imaging operator associated with the object oriented image data. The object type of the imaging operator is determined. Based on the object type of the imaging operator, a set of rendering state information is selected from a plurality of sets of rendering state information stored beforehand in the imaging device. Using the rendering state information, the imaging device renders the object oriented image data into a frame buffer of the imaging device for ready display. Each different object type encountered by the imaging device, a renderstate pointer is loaded with index information so that an appropriate one of the plurality of sets of rendering state information can be quickly and easily accessed for integration into the current graphic state information set for rendering differing object types on the fly.

29 Claims, 6 Drawing Sheets

METHOD AND APPARATUS FOR RENDERING OBJECT ORIENTED IMAGE DATA USING MULTIPLE RENDERING STATES SELECTED BASED ON IMAGING OPERATOR TYPE

This application claims the benefit of U.S. Provisional Application Ser. No. 60/084,625, filed May 7, 1998.

FIELD OF THE INVENTION

The present invention relates to the processing and rendering of object oriented image data in a digital color printing or reproduction system and in digital color display systems. More specifically, the present invention relates to the processing and rendering of object oriented image data using multiple sets of rendering state information items that are prepared and stored in the imaging device and then selected on-the-fly during image rendering based upon the object type classification of the image data that is either inferred from imaging operator type classifications or based on the data directly.

BACKGROUND OF THE INVENTION

Computer-based imaging system have become popular for producing both electronic and hard copy images due in part to the proliferation and availability of desktop publishing programs. In such systems, a host computer typically generates data which describes the image and then transfers the data to an image generating device where it is converted into a format that can be used by the device. Commonly, the image data is in the format of a page description language (PDL), such as, for example, PostScript available from Adobe.

Page description language, i.e., PostScript, compatible desktop publishing and other image producing application programs generate graphic commands which are converted into page description language commands. An imaging device, such as, for example, a printer or display device interprets the page description language commands so that the proper type and sequence of graphics operations can be performed to generate or render the images created in the desktop publishing program. The graphics operations typically include text, graphics, and pictorial (bitmap) operations that are performed on image objects in response to imaging operators imbedded in the page description language.

For each image object, the interpretation process in the imaging device further typically also includes a step of determining the proper set of graphic state arguments, such as color, font, size, and the like, that are to be applied to each image object in order to properly render same. Using this information, pixel display values are created and stored in a frame buffer to represent the colors and shapes of the image objects. A print engine in the imaging device forms the image based directly on the pixel display values stored in the frame buffer. The process within the imaging device of converting the image data received from the host computer into the pixel display values arranged in the frame buffer for ready use by a print engine or display hardware is commonly known in the art as "rendering" an image.

Within the above framework, it is well known in the digital imaging art to use a single collection of parameters to control the production of text, images, graphics, and combinations thereof on a raster output device. The collection of parameters in the PostScript page description environment is called the "Current Graphics State." For convenience in connection with describing the present invention the expression "current graphics state" will be used to describe a data structure holding parameters used to define the global framework in which the graphics operators execute, It is not meant, however, to imply that the invention is limited to the PostScript environment or that it is preferred to use the invention on a PostScript machine.

In practice, the imager continuously references the current graphics state set to render images based on the information generated by the page description language interpreter as it executes normal sources of program text, such as, for example, standard PostScript input files. The page description language interpreter is sometimes located in the host computer but is typically located in the embedded printer. When the imaging operators used to render the image on a page or screen are of homogenous object type, i.e., all graphics object types, all text object types, or all image (bitmap) object types, there is no need to modify the contents of the current graphics state, thereby realizing efficient image data processing. However, current sophisticated desktop publishing systems allow the user to combine different types of image objects into a single composite document. For example, a user can combine photographic images, text, and business graphics (charts) into a single document wherein these images may be either color, black/white, or contain components of both as well.

To achieve satisfactory results, each of these objects needs to be processed differently so that a high quality document can be produced. More particularly with regard to the imaging device, the parameters contained in the current graphics state must be adjusted each time there is a change between image object types so that the proper pixel display values are arranged in the frame buffer. In that way, photographic objects can be processed using a first set of current graphics state parameters, while business graphics, text, etc. may be processed another way using different sets of current graphics state parameters. The current graphics state is switched within a single document. However, the changeover between graphics state parameter sets is a cumbersome and time-consuming process.

To resolve this problem, object oriented rendering systems have been developed. In these systems, the objects which make up a composite document are rendered or processed uniquely. In certain imaging systems, such as, for example, the Xerox Intelligent Color System, object oriented imaging is implemented in the PostScript page description language environment using a technique known as operator overloading. In operator overloading, the particular imaging operators, such as, for example, show (text), fill or stroke (graphics), and image (pictorial) are overloaded or overwritten so that if the parameters contained in the present current graphics state are incorrect or inappropriate for rendering certain objects, they are modified before executing the actual painting operator.

Although the above-described operator overloading technique uniquely renders each object making up a composite document to achieve satisfactory image results, the processing required to recalculate the parameters in the current graphics state and, in addition, the time required for operator overloading in the current graphics state storage results in a significant negative performance impact. This is especially true when text and graphics are handled differently in the imaging device. In addition, the negative performance impact becomes more pronounced when a composite document contains a significant amount of mixed text and graphics objects.

Therefore, it is desirable to provide an object oriented processing and rendering system which allows for quick switching between parameters in the current graphics state without the need to repeatedly recalculate the parameters for efficient rendering and processing of composite-type documents. Moreover, it is desirable to provide an object oriented processing and rendering system that optimizes the switching of parameters in the current graphics state by using a set of pointers to a plurality of rendering states stored beforehand in the imaging device so that they are ready immediately during image rendering.

Further, it is desirable to provide a plurality of pointers into a rendering state array containing a plurality of rendering states so that the switching of parameters in the current graphics state requires only that a pointer buffer be loaded with a value indexing a selected one of a set of rendering states from within the rendering state array. In that way it becomes unnecessary to reconfigure the graphics state.

In other words, it is desirable to provide a processing and rendering system which allows for efficient switching between rendering states without undesirable parameter switching and operator overloading burden. Furthermore, it is desirable to provide a processing and rendering system of the type described which is capable of switching between rendering states based upon imaging object types in composite documents, the imaging object types being inferred from imaging operators contained in a page description language.

SUMMARY OF THE INVENTION

In accordance with the present invention, these objectives are achieved by storing a plurality of sets of rendering state parameter items in a rendering state array within an imaging device. Each set of rendering state parameter items is a sub-set of the full current graphics state utilized by the imaging device to render imaging objects based on imaging operators embedded in a page description language program. In order to quickly and easily make all of the parameters of the current graphics state available on the fly, an appropriate one of the plurality of sets of rendering state parameters is selected from the rendering state array and merged or integrated into the current graphics state to process and render the imaging objects as they are received into the device in turn.

It is another object of the present invention to provide a set of pointers into the rendering state array to quickly and easily index a desired one of the plurality of rendering state parameters to be merged into the current graphics state in order to appropriately render the imaging object using suitable parameters.

In accordance with yet another aspect of the present invention, a set of commands are provided in the page description language for associating imaging object types, i.e., graphics, text, bit map, with a one or more of the plurality of sets of rendering state parameters. The imaging object type is inferred by the imaging operators contained in the page description language. In that way, the appropriate set of rendering state parameters can be indexed and merged into the current graphic state parameters to appropriately render the imaging object using suitable parameters. The merging is seamless because of the efficient use of pointers.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts and in certain steps and arrangements of steps, a preferred embodiment of which will be described in detail in this specification and illustrated in the accompanying drawings, which form a part hereof and wherein.

DETAILED DESCRIPTION OF THE PREFERRED EMBODIMENT

Figure 1:
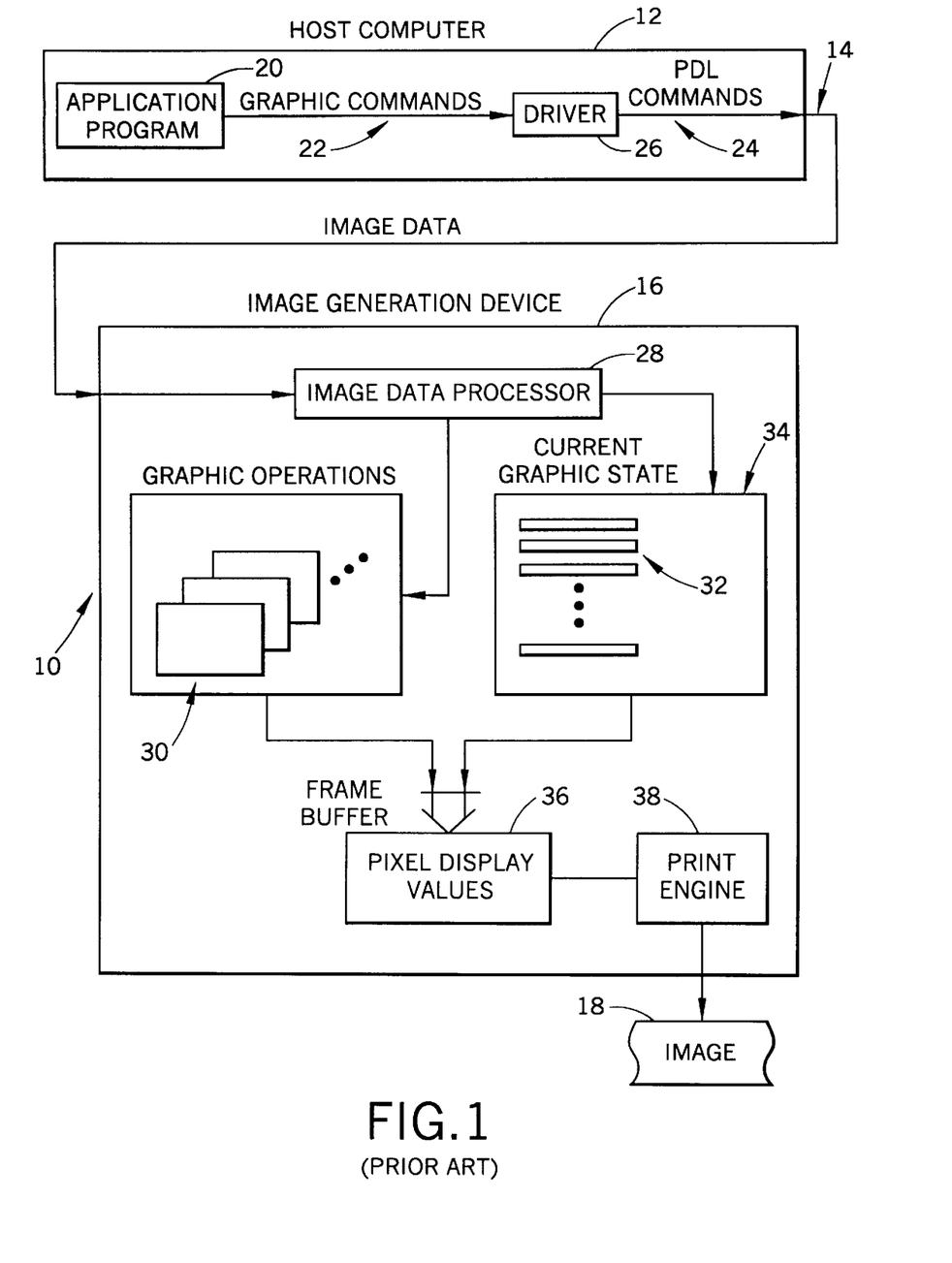
FIG. 1 is a block diagram showing a conventional computer-based imaging system capable of object oriented rendering using operator overloading.

Referring now to the drawings wherein the showings are for the purposes of illustrating the preferred embodiment of the invention only and not for purposes of limiting same, FIG. 1 shows the typical flow of data in a conventional computer-based imaging system 10 capable of object oriented rendering using operator overloading. The imaging system includes a host computer 12 communicating image data 14 to an image generation device 16 to generate an image 18. An application program 20, such as, for example, a desk top publishing program, generates a set of graphic commands 22 that are converted into page description language commands (PDL) 24 by a driver software program 26. In one popular scheme, the driver 26 generates page description language commands in the form of a PostScript language program.

The image data 14 in the form of PDL commands is routed to the image generation device 16, using any suitable communication media such as, for example, twisted pair or fiber optic hardware. An image data processor 28 in the image generation device interprets the page description language commands and thereby determines which type of graphics operations 30 are to be performed, such as draw a rectangle or a particular character of text. In addition, the image data processor performs the necessary calculations to insure that the appropriate set of arguments 32 are lodged in the current graphics state 34 so that the appropriate graphic state arguments such as, for example, color, font, size, and the like are applied to each object. This information is converted into pixel display values in a frame buffer 36 for the control of a print engine 38 to generate the image 18.

In the prior art computer-based imaging system illustrated in FIG. 1, it is necessary that the arguments in the current graphics state are reloaded each time a different image object is encountered in the image data stream 14. The result is a decrease in speed of the system and a commensurate loss of efficient utilization of the image generation device and of the host computer as well.

Figure 2:
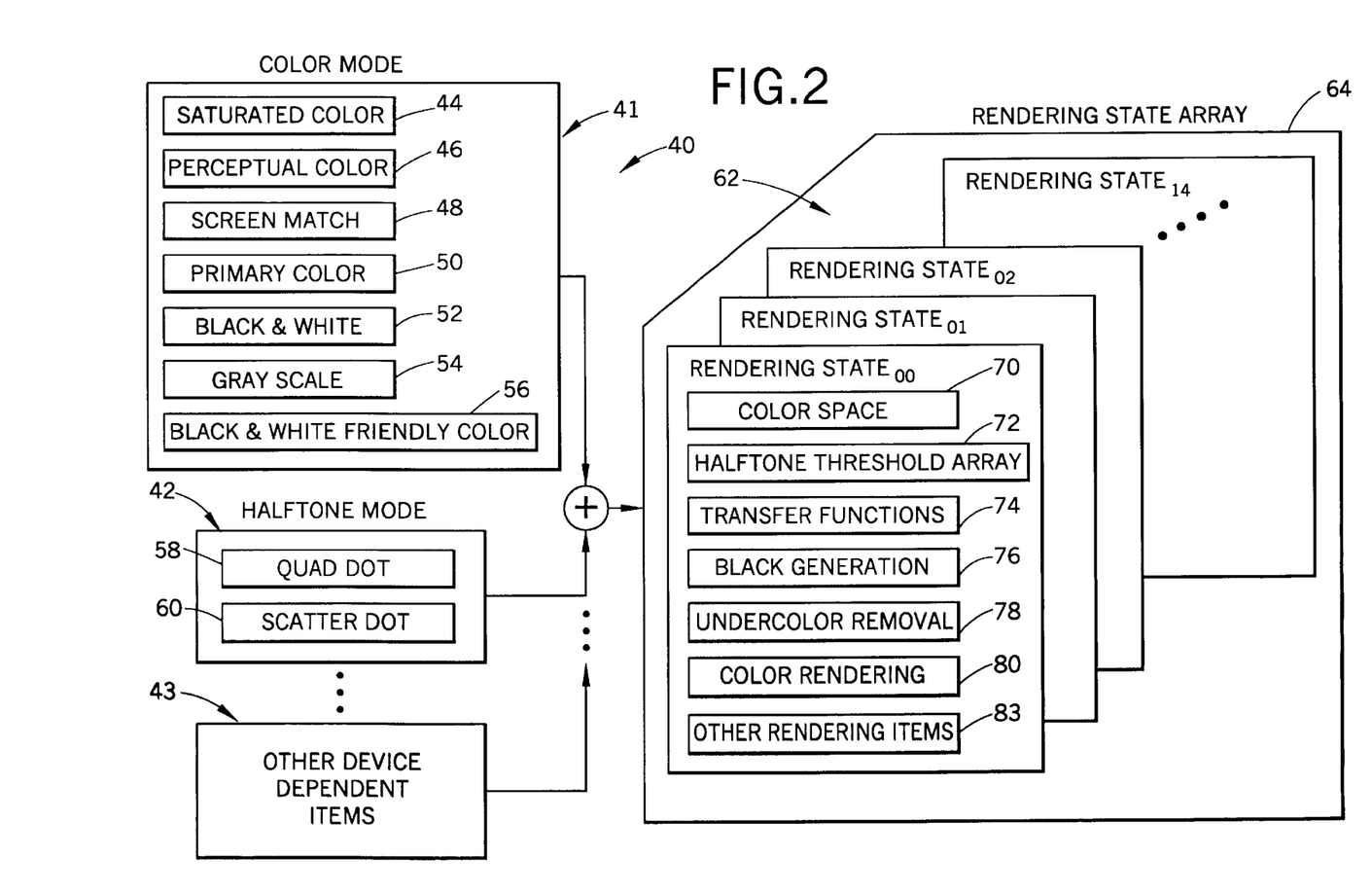
FIG. 2 is a block diagram illustrating the preferred derivation of the multiple sets of rendering state parameters according to the present invention.

With reference next to FIG. 2, the present invention takes advantage of a collection of information elements 40 that are used by the image generation device to render image objects into the frame buffer for ready use by the print engine. Typical standard object types include text, graphics, and pictorial objects although other object types are contemplated as well. The collection of information items 40 includes a color mode setting 41, a halftone mode setting 42 and a plurality of other switchable device dependent items 43 imaging related items such as including trapping mode, outline mode, color to black conversion mode, neutral rendering state and tagging information as examples.

In the preferred embodiment of the invention, the color mode setting 41 includes a number of color mode setting options, namely: a saturated color option 44, a perceptual color option 46, a screen match option 48, a primary color mode option 50, a black & white option color mode option 52, a gray scale color option 54, and, lastly, a black & white friendly color mode option 56. With regard to the user selectable half tone mode setting 42, the choices include a quad dot option 58 and a scatter dot option 60.

The plurality of color mode settings are combinable with the pair of half tone mode settings for translation into a plurality of sets of rendering state parameters rendering_state$_{00}$-rendering_state$_{14}$ as shown. The plurality of sets of rendering state parameters 62 are stored in a rendering state array 64 in the imaging device in accordance with the present invention.

Each set of rendering state parameters define a subset of a full graphics state used by the imaging apparatus to render images as described above. Each set of rendering state parameters includes the current graphics state parameters that change when either of the color mode or half tone mode settings change or when any of the other device dependent parameter items change within the image data stream 14 from the host computer 12. In that regard, each set of rendering state parameters preferably include a color space parameter 70, a halftone threshold array parameter 72, a transfer function parameter 74, a black generation parameter 76, an undercolor removal parameter 78, and, lastly, a color rendering parameter 80, and other rendering items 83.

Figure 3A:
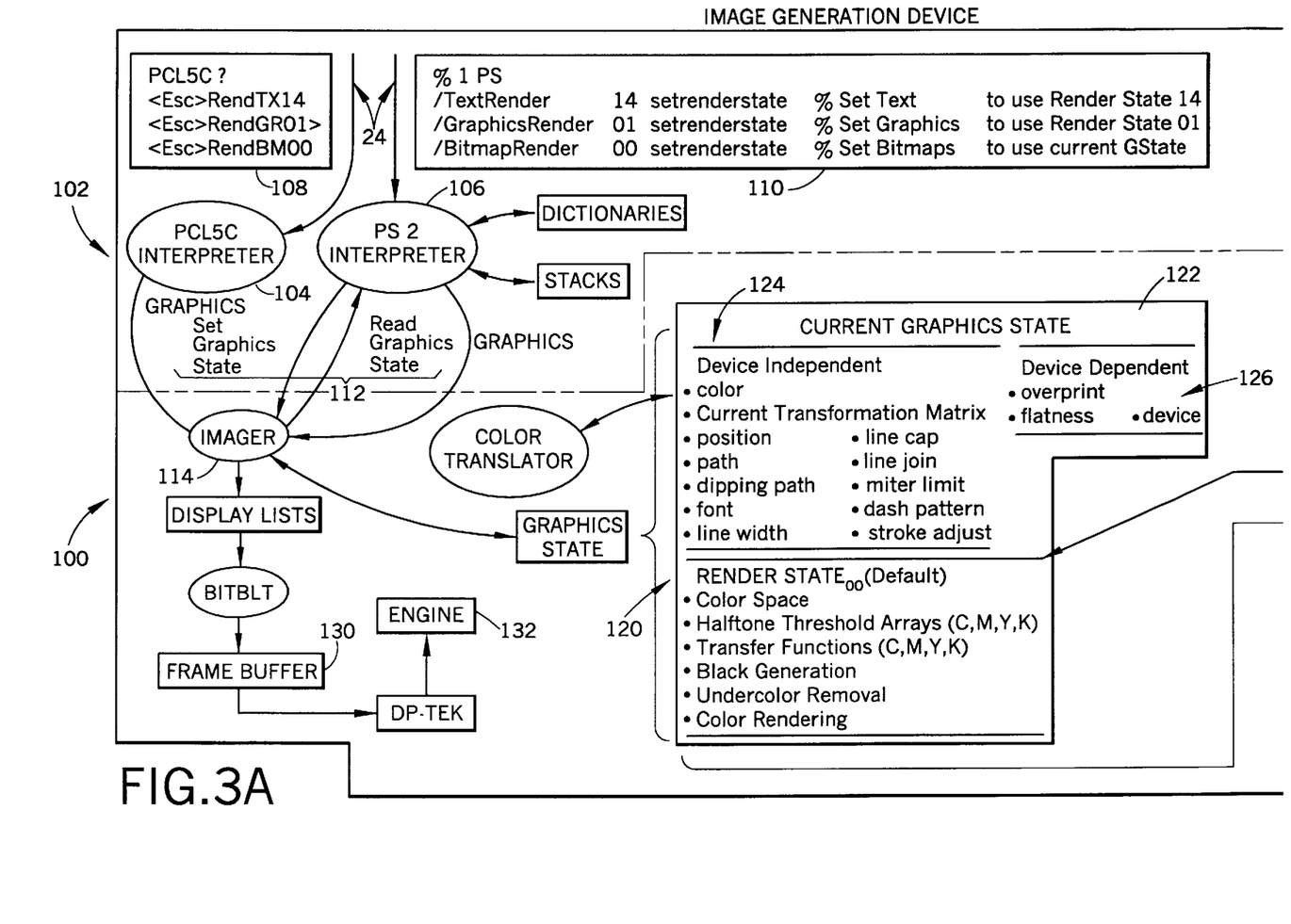
FIG. 3 is a block diagram illustrating the preferred object oriented rendering system using multiple switchable rendering states according to the present invention.
Figure 3B:
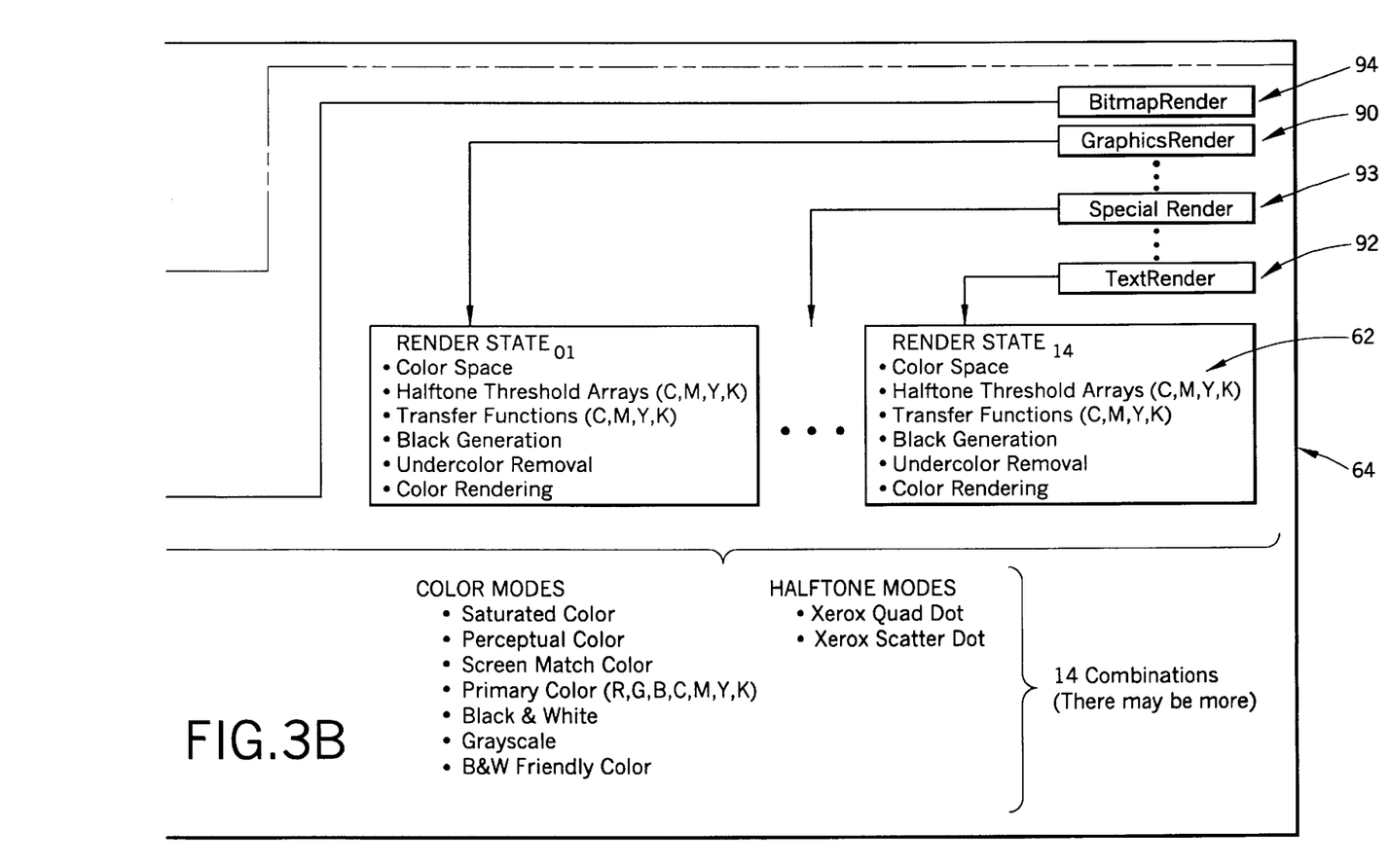

As indicated, the parameters contained in each set of rendering states complete the collection of parameters necessary to define the current graphic state used in an imaging device to render images. This is illustrated in FIG. 3 whereat a set of render state pointers 90, 92, 93, 94 are used as indexes into the rendering state array 64 so that a full complement of current graphics state parameters are available to an imager portion 100 of the image generation device 16 formed in accordance with the present invention. A PDL interpreter portion 102 of the image generated device 16 is also shown and includes a pair of page description language interpreters 104, 106 for interpreting first and second varieties of page description language programs 108, 110 respectively. More PDL interpreters can be provided to add flexibility to the subject image generation device, or, alternately, only a single interpreter can be used to create a dedicated device.

The pair of interpreters 104, 106 generate image data 112 that is communicated between the interpreters and an image processor 114 disposed in the imager 100. The image processor 114 is adapted to manipulate and utilize the parameters 120 contained within the current graphics state 122. The current graphics state includes a set of device independent parameters 124 and a set of device dependent parameters 126. In accordance with the present invention, the set of render state pointers 90, 92, 93, 94 are used as an index into the rendering state array 64 to form the complete set of parameters defining them so that the imaging processor 114 can render the appropriate image by writing suitable pixel display values into a frame buffer 130. The pixel display values in the frame buffer control the print engine 132 using techniques well known to those skilled in the art.

With regard to formation and utilization of the plurality of sets of rendering state parameters 62 contained within the rendering state array, a number of page description language operators are provided, namely: "setrenderstate", "definerenderstate", and "findrenderstate".

Each of the page description language operators, their use and function are as described below.

setrenderstate:

(objectidentstring renderstateindex setrenderstate-)

The setrenderstate operator associates a particular object type identified by the objectident string (/TextRender,/GraphicsRender or /BitmapRender) with a particular rendering state identified by the renderstateindex 0 . . . n. The index 0 has a special value as indicating the normal RenderState stored in the current Gstate, which means that no rendering is to occur.

definerenderstate:

(gstate renderstateindex definerenderstate-)

The definerenderstate operator is used to set a particular rendering state as identified by the renderstateindex. The gstate object on the operand stack is used to define the renderstate to be stored. It should be noted that an index of 0 will set the current Gstate from the Gstate object on the operand stack, which is similar in operation to the currentgstate operator.

findrenderstate:

(renderstateindex findrenderstate gstate)

The findrenderstate operator is used to retrieve a particular rendering state identified by the renderstateindex and place it along with the rest of the Gstate on the operand stack. This operator is normally followed by the setgstate operator in the PostScript page description language so that modifications can then be made to the Gstate using the normal operators and the modified rendering state can then be stored back by using the definerenderstate operator.

Figure 4:
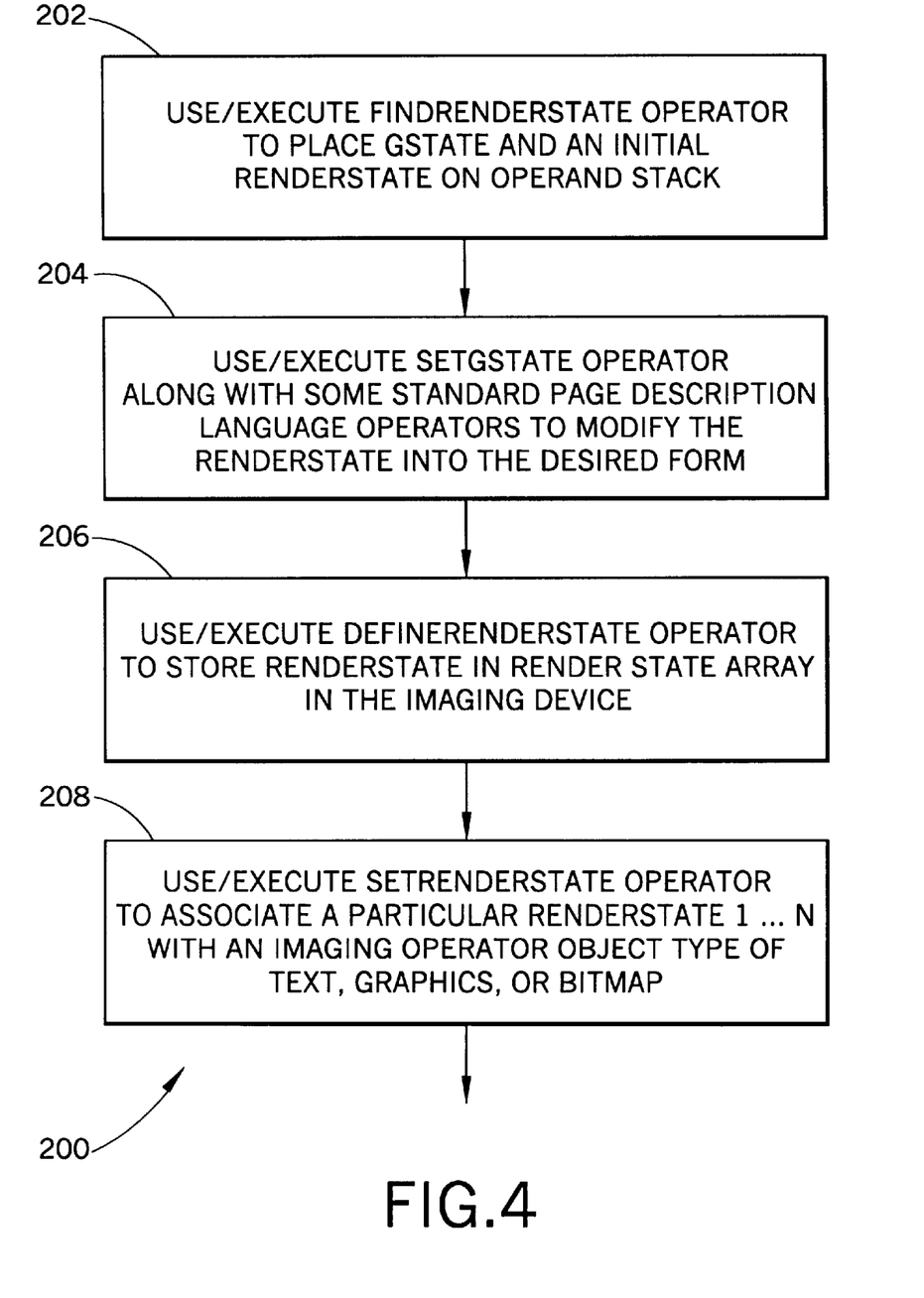
FIG. 4 is a flow chart illustrating the preferred method of forming the rendering state array in the imaging device according to the present invention; and, FIG. 5 is a flow chart illustrating the preferred method of operator oriented rendering using multiple selectable rendering states stored in an array in the imaging device according to the present invention.

The page description language operators are used in a manner as shown in FIG. 4 to define the plurality of sets of rendering state parameters contained within the rendering state array. At step 202, the findrenderstate operator is used to place the current Gstate or "Gstate" and an initial RenderState on an operand stack in one of the pair of page description language interpreters 104, 106. Once the current graphics state and the initial RenderState is on the operand stack, the SETGSTATE operator is used at step 204 along with other standard page description language operators to modify one or more of the RenderState parameters 70–83 into a desired form. At step 206, the definerenderstate operator is executed by one of the page description language interpreters 104, 106 to store the RenderState from the stack into the renderstate array in the imaging device 100. Lastly, at step 208, the setrenderstate operator is executed to associate a particular one of the plurality of sets of Render_State$_{00}$ parameters—Render_State$_{14}$ parameters with an imaging operator object type of text, graphics, or bit map.

The method 200 illustrated in FIG. 4 is executed for each of the plurality of sets of rendering state parameters 62 to be stored in the rendering state array 64 in the imaging device 100.

Figure 5:
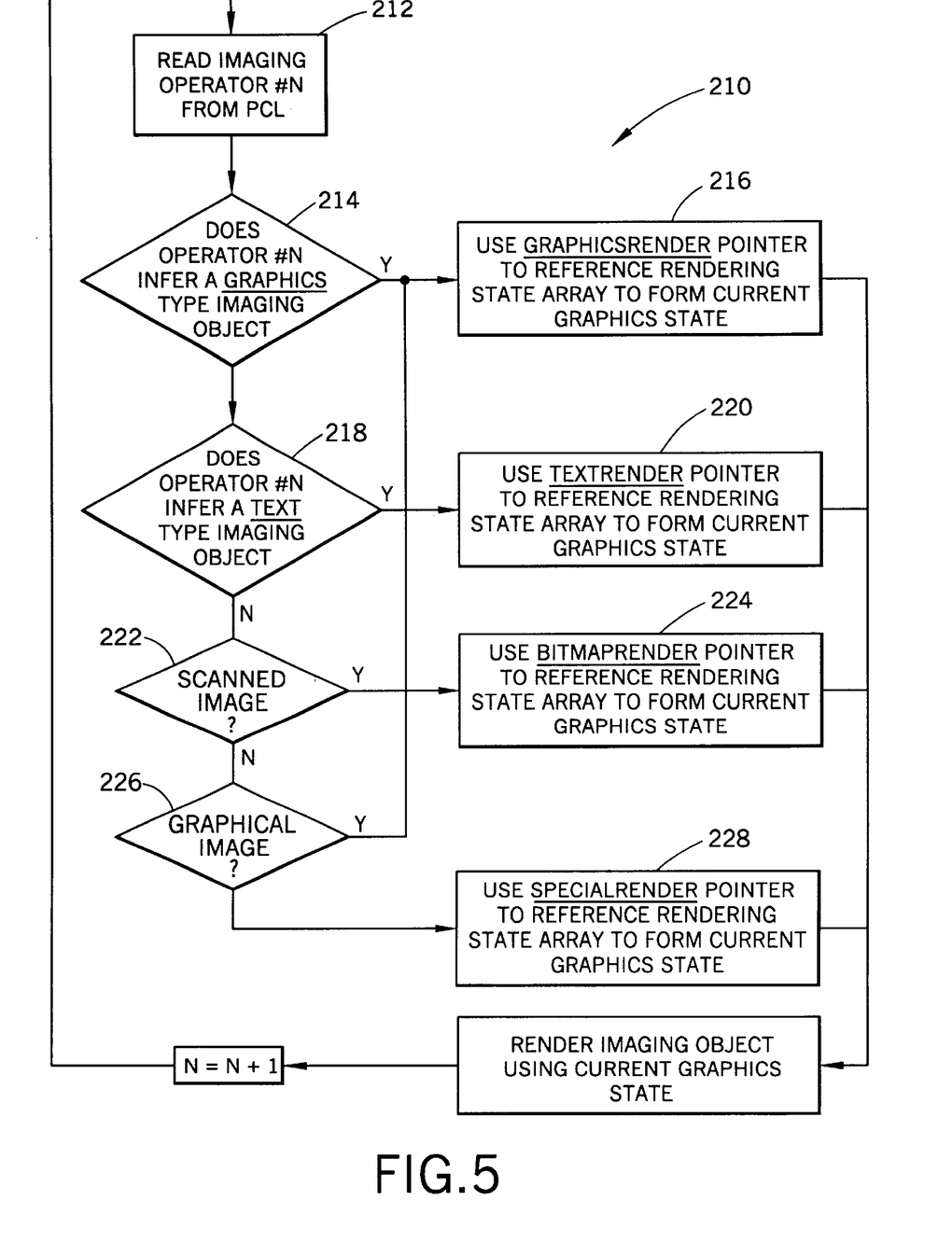

Turning now to FIG. 5, the preferred method of modifying a current graphics state in an imaging device to render object oriented image data in a manner based on an object type classification of imaging operators contained in a page description language program will be described. The method 210 includes reading a first imaging operator into the imaging device at step 212. At step 214, a determination is made whether the first imaging operator infers a graphics type imaging object. If it does, the graphicsrender pointer 90 is used to reference the rendering state array to form the current graphics state at step 216.

At step 218, a determination is made whether the first operator infers a text type imaging object. If it does, the textrender pointer 92 is used to reference the rendering state array 64 to form the current graphic state 122 at step 220.

In the event that neither of the determining steps 214 or 218 concluded that either a graphics or text type imaging object was encountered in the page description language, a test is made at step 222 to determine whether the image is a scanned image. If it is, the bitmaprender pointer 94 is used to reference the rendering state array 64 to form the current graphics state 122 at step 224.

Having established the appropriate parameters in the current graphics state by suitably selecting the appropriate render state pointer 90, 92, or 94, the imaging object is rendered at step 224 using the current graphics state.

If the image is not a scanned image, a test is made at step 226 to determine whether the image is a graphical image. If it is, the graphicsrender pointer 90 is used to reference the rendering state array 64 to form the current graphics state 122 at step 216. If the image is not a graphical image, it is determined at step 228 that the image is a one of N special type image. At that point, a one of N specialrender pointers 93 is used to reference the rendering state array to form the current graphics state 122.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of modifying a current graphics state in an imaging device to render object oriented image data in a manner based on an object type classification of imaging operators contained in a page description language program, the method comprising the steps of:

storing a plurality of rendering states in a rendering state array in the imaging device, each of the rendering states forming a portion of a first current graphics state used by the imaging device to render an image;

executing a command operator in an interpreter of a page description language to associate ones of said plurality of rendering states with corresponding ones of a set of object types;

while consuming a first program prepared for the imaging device in said page description language:
        reading first object oriented image data and a first imaging operator associated in said first program with said first object oriented image data;
        determining a first object type of the first imaging operator;
        based on an association between said ones of said set of object types and said ones of said plurality of rendering states established in said command operator executing step, selecting a first rendering state from among said plurality of rendering states in said rendering state array; and,
        merging said first rendering state into said first current graphics state to generate a second current graphics state; and,
        rendering said first object oriented image data using said second current graphics state.

2. The method according to claim 1 further including the step of providing a set of pointers in the imaging device, the set of pointers including:

a first pointer indexing a bitmap type rendering state among said plurality of rendering states in the rendering state array;

a second pointer indexing a graphics type rendering state among said plurality of rendering states in the rendering state array; and, a third pointer indexing a text type rendering state among said plurality of rendering states in the rendering state array.

3. The method according to claim 2 wherein said step of merging said first rendering state into said first current graphics state to generate said second current graphics state includes:

using at least a one of said first pointer, said second pointer, and said third pointer to augment said portion of the first rendering state with at least a one of said bitmap type rendering state, said graphics type rendering state, and said text type rendering state, respectively, to generate said second current graphics state.

4. The method according to claim 3 wherein the step of storing said plurality of rendering states in said rendering state array in the imaging device includes:

storing said plurality of rendering states in said rendering state array, each of the rendering states forming said portion of said first current graphics state defining a color mode and a halftone mode used by the imaging device to render an image.

5. The method according to claim 4 wherein:

the step of storing said plurality of rendering states in the imaging device includes storing said plurality of rendering states in said rendering state array, each of the current graphics state defining said color mode and said halftone mode used by the imaging device to render an image;

the color mode including first imaging parameters of saturated color, perceptual color, screen match, primary color, black and white, grey scale, and black and white friendly color; and, the halftone mode including second imaging parameters of quad dot information and scatter dot information.

6. The method according to claim 1 further comprising the steps of:

while consuming said first program prepared for the imaging device in said page description language:
        reading second object oriented image data and a second imaging operator associated in said first program with said second object oriented image data;
        determining a second object type of the second imaging operator;
        based on an association between said ones of said set of object types and said ones of said plurality of rendering states established in said command operator executing step, selecting a second rendering state from among said plurality of rendering states in said rendering state array;
        merging said second rendering state into said second current graphics state to generate a third current graphics state; and,
        rendering said second object oriented image data using said third current graphics state.

7. The method according to claim 6 further including the step of providing a set of pointers in the imaging device, the set of pointers including:

a first pointer indexing a bitmap type rendering state among said plurality of rendering states in the rendering state array;

a second pointer indexing a graphics type rendering state among said plurality of rendering states in the rendering state array; and, a third pointer indexing a text type rendering state among said plurality of rendering states in the rendering state array.

8. The method according to claim 7 wherein:

said step of merging said first rendering state into said first current graphics state to generate said second current graphics state includes:

using at least a one of said first pointer, said second pointer, and said third pointer to augment said portion of the first rendering state with at least a one of said bitmap type rendering state, said graphics type rendering state, and said text type rendering state, respectively, to generate said second current graphics state; and, said step of merging said second rendering state into said second current graphics state to generate said third current graphics state includes:

using at least a one of said first pointer, said second pointer, and said third pointer to augment said portion of the second rendering state with at least a one of said bitmap type rendering state, said graphics type rendering state, and said text type rendering state, respectively, to generate said third current graphics state.

9. The method according to claim 1 wherein the step of determining said first object type of the first imaging operator includes determining a first object type of the first object oriented image data regardless of an object type of the first imaging operator.

10. In an imaging device capable of rendering images based on graphics state information stored in the imaging device, a method of operator oriented imaging comprising the steps of:

reading first object oriented image data and a first imaging operator associated with said first object oriented image data;

determining a first object type of the first imaging operator;

based on the first object type of the first imaging operator, selecting first rendering state information from among a plurality of sets of rendering state information stored in said imaging device;

without recalculating parameters of said graphics state information, merging said first rendering state information into said graphics state information to generate current graphics state information; and, using said current graphics state information, rendering said first object oriented image data into a frame buffer of said imaging device.

11. The method according to claim 10 wherein said first imaging operator is a one of a graphics object type operator, a text object type operator and a bitmap object type operator.

12. The method according to claim 11 wherein said first rendering state information includes color space information, halftone threshold information, transfer function information, black generation information, undercolor removal information, and color rendering information.

13. The method according to claim 11 wherein the step of merging includes combining said first rendering state information with first said graphics state information stored in the imaging device by indexing a rendering state array stored in the imaging device containing said plurality of sets of rendering state information using a pointer loaded with an array address value based on said first object type of the first imaging operator.

14. The method according to claim 13 wherein the step of indexing said rendering state array stored in the imaging device includes:

using a first pointer loaded with a first array address value when said first imaging operator is said graphics object type operator;

using a second pointer loaded with a second array address value when said first imaging operator is said text object type operator; and, using a third pointer loaded with a third array address value when said first imaging operator is said bitmap object type operator.

15. The method according to claim 10 further including the steps of:

merging said first rendering state information into first graphics state information in the imaging device to generate second graphics state information;

rendering said first object oriented image data into said frame buffer of said imaging device using said second graphics state information;

reading second object oriented image data and a second imaging operator associated with said second object oriented image data;

determining a second object type of the second imaging operator;

based on the second object type of the second imaging operator, selecting second rendering state information from among said plurality of sets of rendering state information stored in said imaging device;

merging said second rendering state information into said second graphics state information stored in the imaging device to generate a third graphics state information; and, rendering said second object oriented image data using said third graphics state information.

16. A method of object oriented imaging in an imaging device capable of rendering an image using image data and associated imaging operators from a page description language interpreter, the method comprising the steps of:

providing in the imaging device a set of graphics state information used by the imaging device to render images;

providing in the imaging device a plurality of sets of render state information in an array, at least a first set of render state information specifying a first rendering state to be applied to a graphics object type imaging operator, at least a second set of render state information specifying a second rendering state to be applied to a text object type imaging operator, and at least a third set of render state information specifying a third rendering state to be applied to a bitmap object type imaging operator;

providing in the imaging device at least three pointers including a first pointer indexing said first set of render state information, a second pointer indexing said second set of render state information, and a third pointer indexing said third set of render state information;

providing in the page description language interpreter a set of operators for associating each imaging operator type in the page description language interpreter with a one of said first set of render state information, said second set of render state information, and said third set of render state information;

while executing a program prepared for the imaging device in said page description language interpreter, reading first object oriented image data and a first imaging operator associated in said program with said first object oriented image data and determining a first object type of the first imaging operator;

based on the first object type and an association between said imaging operator type and said first, second, and third sets of render state information, selecting a one of said first, second, and third pointers;

using the selected pointer, cancantenating a selecting one of said first, second, and third sets of render state information into a first set of graphics state information to generate a second set of graphics state information; and, rendering said first object oriented image data using said second set of graphics state information.

17. The method according to claim 16 wherein the step of providing said plurality of sets of render state information in the array includes providing in each of said plurality of sets of render state information in the array a unique combination of color mode information and halftone mode information.

18. The method according to claim 17 wherein the step of providing each of said unique combination of color mode information and halftone mode information includes providing a unique combination of color space information, halftone threshold array information, transfer function information, black generation information, and undercolor removal information.

19. The method according to claim 16 wherein the step of providing said set of operators in the page description language interpreter includes providing:

a define_renderstate operator for defining a set of render state objects and associating each of the set of render state objects with a set of unique render state object identifiers, each of said render state objects corresponding to ones of said plurality of sets of render state information in said imaging device;

a find_renderstate operator for retrieving selected ones of said plurality of sets of render state information into a temporary storage location in the imaging device based on a first parameter; and, a set_renderstate operator for associating a set of object types including one of said graphics object type, said text object type, and said bitmap object type with particular rendering states identified by a second parameter.

20. In an imaging device capable of rendering images based on graphics state information stored in the imaging device, a method of operator oriented imaging without a need to recalculate parameters of the graphics state information, the method comprising the steps of:

reading first object oriented image data and a first imaging operator associated with said first object oriented image data;

based on the first imaging operator, selecting first rendering state information from among a plurality of sets of rendering state information stored in said imaging device; and, rendering said first object oriented image data using said first rendering state information in combination with said graphics state information stored in the imaging device without recalculating said parameters of the graphics state information.

21. The method according to claim 20 wherein said first imaging operator is a one of a graphics object type operator, a text object type operator and a bitmap object type operator.

22. The method according to claim 21 wherein said first rendering state information includes color space information, halftone threshold information, transfer function information, black generation information, undercolor removal information, and color rendering information.

23. The method according to claim 20 wherein the step of selecting said first rendering state information from among said plurality of sets of rendering state information includes the step of determining a first object type of the first imaging operator.

24. The method according to claim 23 further including the step of merging said first rendering state information into first graphics state information stored in the imaging device to generate second graphics state information.

25. The method according to claim 24 wherein the step of rendering said first object oriented image data includes rendering said first object oriented image data using said second graphics state information.

26. A method of object oriented imaging in an imaging device capable of rendering an image using image data and associated imaging operators from a page description language interpreter, the method comprising the steps of:

providing in the imaging device a set of graphics state information used by the imaging device to render images;

providing in the imaging device a plurality of sets of render state information, at least a first set of render state information specifying a first rendering state to be applied to a graphics object type image data, at least a second set of render state information specifying a second rendering state to be applied to a text object type image data, and at least a third set of render state information specifying a third rendering state to be applied to a bitmap object type image data;

providing in the imaging device at least three pointers including a first pointer indexing said first set of render state information, a second pointer indexing said second set of render state information, and a third pointer indexing said third set of render state information;

providing a set of operators associating each image data type with a one of said first set of render state information, said second set of render state information, and said third set of render state information;

while executing a program prepared for the imaging device in said page description language interpreter, reading first object oriented image data and determining a first object type of the first object oriented image data;

based on the first object type and an association between said image data type and said first, second, and third sets of render state information, selecting a one of said first, second, and third pointers;

using the selected pointer, cancantenating a slected one of said first, second, and third sets of render state information into a first set of graphics state information to generate a second set of graphics state information; and, rendering said first object oriented image data using said second set of graphics state information.

27. The method according to claim 26 wherein the step of providing said plurality of sets of render state information includes providing in each of said plurality of sets of render state information a unique combination of color mode information and halftone mode information.

28. The method according to claim 27 wherein the step of providing each of said unique combination of color mode information and halftone mode information includes providing a unique combination of color space information, halftone threshold array information, transfer function information, black generation information, and undercolor removal information.

29. The method according to claim 26 wherein the step of providing said set of operators includes providing:

a define_renderstate operator for defining a set of render state objects and associating each of the set of render state objects with a set of unique render state object identifiers, each of said render state objects corresponding to ones of said plurality of sets of render state information in said imaging device;

a find_renderstate operator for retrieving selected ones of said plurality of sets of render state information into a temporary storage location in the imaging device based on a first parameter; and, a set_renderstate operator for associating a set of object types including one of said graphics object type, said text object type, and said bitmap object type with particular rendering states identified by a second parameter.

* * * * *